(12) United States Patent
Sullivan

(10) Patent No.: US 10,578,447 B2
(45) Date of Patent: Mar. 3, 2020

(54) METHOD FOR IDENTIFYING SAFE AND TRAVERSABLE PATHS

(71) Applicant: Nova Dynamics, LLC, Philomath, OR (US)

(72) Inventor: Joseph Lloyd Sullivan, Philomath, OR (US)

(73) Assignee: Nova Dynamics, LLC, Philomath, OR (US)

( * ) Notice: Subject to any disclaimer, the term of this patent is extended or adjusted under 35 U.S.C. 154(b) by 0 days.

(21) Appl. No.: 15/361,041

(22) Filed: Nov. 24, 2016

(65) Prior Publication Data
US 2018/0299278 A1 Oct. 18, 2018
US 2019/0170524 A9 Jun. 6, 2019

Related U.S. Application Data

(60) Provisional application No. 62/259,152, filed on Nov. 24, 2015.

(51) Int. Cl.
| | |
|---|---|
| *G01C 21/34* | (2006.01) |
| *G06K 9/00* | (2006.01) |
| *G01C 21/32* | (2006.01) |

(52) U.S. Cl.
CPC ......... *G01C 21/3453* (2013.01); *G01C 21/32* (2013.01); *G01C 21/3461* (2013.01); *G06K 9/00664* (2013.01)

(58) Field of Classification Search
CPC .............. G01C 21/3461; G05D 1/0214; G05B 2219/31007
See application file for complete search history.

(56) References Cited

U.S. PATENT DOCUMENTS

| | | |
|---|---|---|
| 5,058,024 A | 10/1991 | Inselberg |
| 5,559,511 A | 9/1996 | Ito et al. |
| 5,787,262 A | 7/1998 | Shakib |
| 5,806,074 A | 9/1998 | Souder et al. |
| 5,884,075 A | 3/1999 | Hester et al. |
| 5,889,953 A | 3/1999 | Thebaut et al. |
| 6,205,397 B1 | 3/2001 | Eslambolchi |
| 6,490,522 B2 | 12/2002 | Sugiyama |
| 7,076,409 B2 | 7/2006 | Agrawala |
| 7,430,261 B2 | 9/2008 | Forest et al. |
| 7,565,419 B1 | 7/2009 | Kwiatkowski |
| 9,668,484 B2 | 6/2017 | Bristow |
| 2003/0220966 A1 | 11/2003 | Hepper et al. |
| 2016/0123743 A1* | 5/2016 | Sisbot ................ G01C 21/3461 701/538 |

\* cited by examiner

*Primary Examiner* — Daniel Swerdlow
(74) *Attorney, Agent, or Firm* — Dascenzo Intellectual Property Law, P.C.

(57) ABSTRACT

A method for manually or semi-manually mapping an urban environment to locate a safe, traversable path within the environment is provided herein. An area is mapped by an entity that traverses sidewalks, ramps, driveways, crosswalks, and other terrain in the area to create a memory of usable paths to reach addressed destinations. A human operator, possibly assisted by a computer-executed mathematical algorithm, approves routes that are considered safe. When a route is approved, it enters the memory as a safe, traversable route. If a route is not approved, it is marked as unsafe and the entity finds an alternate route to get to the same location such as by going around the block or in another direction.

20 Claims, 5 Drawing Sheets

METHOD FOR IDENTIFYING SAFE AND TRAVERSABLE PATHS

CROSS REFERENCES TO RELATED APPLICATIONS

This application claims priority to U.S. Provisional Patent Application Ser. No. 62/259,152 filed on Nov. 24, 2015 entitled "Product Delivery System and Apparatus", the disclosure of which is hereby incorporated by reference.

BACKGROUND OF THE INVENTION

The present invention relates generally to delivering cargo via transport routes, and more particularly to a system for mapping and generating a collection of routes that can be safely traversed.

BACKGROUND ART

The most varied fields of use can be conceived for autonomously operating units. They are particularly suitable for use in danger areas, remote sensing, and for performing relatively simple tasks. They are also capable of highly varied transportation activities such as acting as an autonomous transport or delivery vehicle for the retail industry. In executing activities, an autonomous mobile unit is confronted, however, with the problem of having to draw up a map of surroundings which are at first unknown, and of being able to use this map to locate itself at any given instant in its working environment. To solve this problem, it is expedient to pre-load the autonomous unit with known "safe" routes or paths of travel that have been deemed to be free from obstacles or dangers. To ensure continued safety to the unit and other people or structures in the environment, it is desirable to have the autonomous unit continuously gather data about the route during transit. The newly gathered data is used to ensure that a route remains safe.

Prior methods for developing known safe routes generally tend to rely on retrieving and utilizing data from the Geographical or Global Information System (GIS). GIS has allowed users to create spatial representations of the world for use in decision-making, navigation and many other applications that link natural and man-made features with their relative and unique 3-D positions on or near Earth. Data include Earth topography and vegetation, as mostly gathered by satellite imagery. Other Features, such as the centerline of a road, are gathered by driving a vehicle with a GPS (Global Positioning System) system and noting the location of intersections and waypoints. Utility locations are input by surveying with GPS. Collected into GIS databases, the data subsequently are used for vehicle navigation, building operations, emergency response, environmental health, and a wide variety of other applications. However, manual re-evaluation is time consuming, so most GIS data tends to be acquired once, and is updated rarely, if ever.

GIS data updates, however, are need for differential analyses in several different areas. In a security application, for example, change analysis may detect and locate intruders or re-locate moveable assets. For hazard detection, changing levels of water, heat, smoke, radiation, or gases may initiate investigations. For foresters, tree trunk sizes may indicate time to harvest.

GIS data are often physical phenomena. Originally, GIS consisted of databases of satellite images of Earth, typically taken in multiple spectra. By comparing the various images over time, objects, changes, and patterns could be identified. While some features and their attributes can be imaged from satellites very efficiently, many physical objects are out of satellite view. Even where features are in view, it can be difficult to distinguish those features in a satellite view, and it is especially difficult to distinguish them automatically using software image analysis, for example. Thus, many features must be located manually, or local sensors must be placed at known locations to locate and/or track specific features. However, requiring humans to constantly re-evaluate safe routes or installing sensor systems along the safe route can be expensive and unsightly.

Allowing an autonomous unit to orient itself while traveling and simultaneously build up a map of the unknown surroundings poses the problem that there is a mutual functional relationship between drawing up the map of the surroundings and correctly identifying hazards or non-traversable paths. An important role is played here by, in particular, the type and accuracy of the sensors which the robot uses to survey the path it has covered and to locate obstacles in the surroundings. For example, the path covered from a starting point may be determined with the aid of a wheel sensor. On the other hand, the distance from obstacles which occur may be measured with the aid of distance sensors, and said obstacles are entered as landmarks in the map of the surroundings. Because of the mutual functional relationship between the measuring procedure for determining the distance of obstacles and the procedure for measuring the path distance covered in conjunction with drawing up the map and with the errors which the measuring sensors have, these errors accumulate as a function of the path distance covered by the robot.

The autonomous mobile unit can therefore no longer operate sensibly beyond a specific distance.

A method which addresses this problem and indicates a solution for it was advanced by W. D. Rencken in the article "Concurrent Localisation and Map Building for Mobile Robots Using Ultrasonic Sensors", Proc. of the 1993 IEEE/RSJ. International Conference on Intelligent Robots and Systems, Yokohama, Jap. Jul. 26 to Jul. 30, 1993, pages 2192 to 2197. The known measuring errors of the sensors used are used there for correcting a predicted landmark position, found with the aid of the internal map, as a function of a path distance covered. The absolute measuring error which occurs during the movement of the autonomous mobile unit is thereby reduced.

A further method for orientating self-propelled mobile units in unknown surroundings consists in the unit building up a two-dimensional grid of its surroundings and providing individual cells of this grid with occupancy values. The occupancy values assigned per grid cell represent the occurrence of obstacles in the surroundings.

Such a method is specified by the published document "Histogrammic in-motion mapping for mobile robot obstacle avoidance", IEEE Transactions on Robotics Automation, Vol. 7, No. 4, August 1991, by J. Borenstein and Yoram Koren. It is described there how ultrasonic sensors can be used to draw up a map of the surroundings of a self-propelled mobile unit.

The process of drawing up a map while the robot is possibly continuing to travel and being repositioned is extremely hardware intensive, time consuming and requires a control computer to perform computations. This hampers the robot in carrying out an activity it has been assigned.

It is therefore extremely desirable for an autonomous mobile unit not to use too much time for orientation or hazard identification or location tasks when performing a task defined by the user. However, it is also important in this case that within the context of the task which has been set the unit can always maintain a defined measure of accuracy of orientation and hazard identification and location. This means, in other words, that the positional error of the autonomous unit, nor the probability of correctly identifying and mapping a tree across a sidewalk, should not overshoot a certain limit, otherwise said unit would no longer be able, for example, to deposit milk on the doorstep of a delivery customer.

The present invention provides a solution to the shortcomings of the prior art by setting forth a method in which a route is traversed manually or partially autonomously by an entity, then evaluated to see if the route is safe and traversable, then finally stored in a memory and re-mapped to develop safe operating tolerances.

BRIEF SUMMARY OF THE INVENTION

The present invention provides for manually or semi-manually mapping an urban environment. In an embodiment of the invention, a neighborhood is observed and recorded by a person that traverses sidewalks, ramps, driveways, crosswalks, and other terrain in the neighborhood to create a "memory" of usable paths to reach addressed destinations. A human operator, possibly assisted by algorithm, approves routes that are considered safe. When a route is approved, it enters the database as new route and may be used for traversal. If a route is not approved, it is marked as unsafe and the operator finds an alternate route to get to the same location, such as by going around the block in the other direction.

If a route is approved, a mapping phase begins. During the mapping phase, each route is scanned using a plurality of sensors: GPS, video, laser, etc. and each sensor output is saved in high level, summary, form. Ideally each path is mapped more than once under differing conditions A maximum amount of deviation, or delta, can be determined for each sensor using empirical or Bayesian methods.

Other novel features which are characteristics of the invention, as to organization and method of operation, together with further and advantages thereof will be better understood from the following description considered in connection with the accompanying figures, in which preferred embodiments of the invention are illustrated by way of example. It is to be expressly understood, however, that the figures are for illustration and description only and are not intended as a definition of the limits of the invention. The various features of novelty which characterize the invention are pointed out with particularity in the following description. The invention resides not in any one of these features taken alone, but rather in the particular combination of all its structures for the functions specified.

Figure 1:
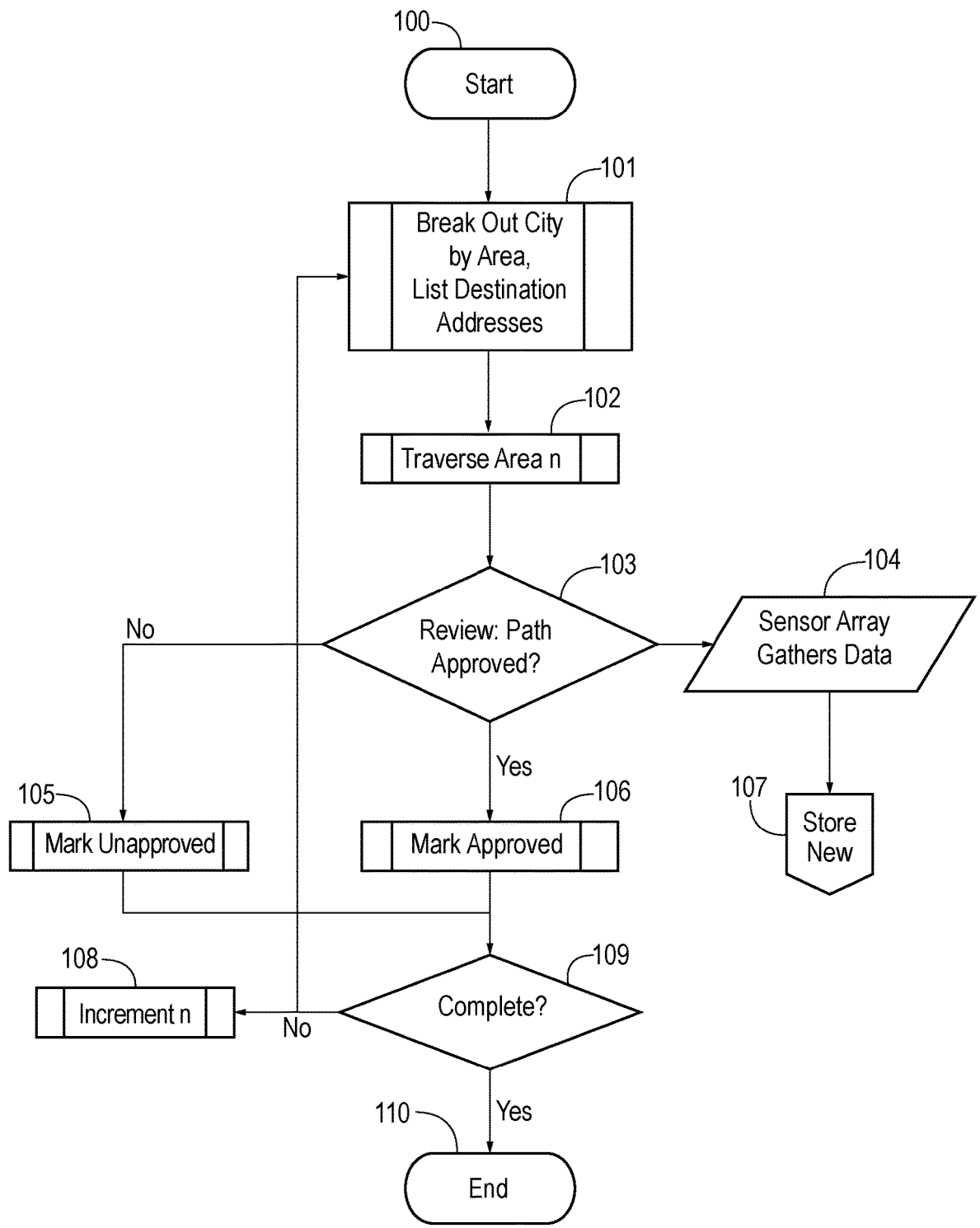
FIG. 1 is a flowchart showing the steps in an algorithm for mapping a safe, traversable path as according to an embodiment of the present invention.

A further understanding of the present invention can be obtained by reference to a preferred embodiment set forth in the accompanying description. Although the illustrated embodiments are merely exemplary of methods for carrying out the present invention, both the organization and method of operation of the invention, in general, together with further objectives and advantages thereof, may be more easily understood by reference to the illustrations and the following description. The figures are not intended to limit the scope of this invention, but merely to clarify and exemplify the invention.

DETAILED DESCRIPTION OF THE INVENTION

In the following detailed description, reference is made to specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the terms "embodiment(s) of the invention", "alternative embodiment(s)", and "exemplary embodiment(s)" do not require that all embodiments of the method(s) or apparatus include the discussed feature, advantage or mode of operation. The following description of the preferred embodiment is merely exemplary in nature and is in no way intended to limit the invention, its application, or use.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter. Those skilled in the art will appreciate that the conception upon which this disclosure is based may be readily utilized as a basis for the designing of other structures, methods and systems for carrying out the purposes of the present invention. It is important, therefore, that any embodiments of the present invention be regarded as including such equivalent constructions insofar as they do not depart from the spirit and scope of the present invention.

Further, the purpose of the Abstract herein is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application nor is it intended to be limiting as to the scope of the invention in any way.

Referring now to the present invention, there is introduced a method for manually or semi-manually locating safe and traversable paths within an urban environment. For the purpose of clarity, all like elements mentioned in this description will have the same designations. The terms "method for manually or semi-manually locating safe and traversable paths in an urban environment", "method for locating safe and traversable paths", "method", "invention", and "present invention" may be used interchangeably. In addition to the functions, features, components, and abilities of the invention already discussed in this specification, the invention may also have, but not be limited to, the following features contained within the description below.

Referring now to FIG. 1, there is shown a flowchart depicting the steps in an algorithm for mapping a safe, traversable path as according to an embodiment of the present invention. The method starts (100) when a user, a person, identifies an area in which to work. The area in which to work is a given city or area within a city (101). The area can also be an entire small town, a neighborhood, a commercial area of a large town, or any selected area of an urban environment in which a user wishes to operate. A starting address, hereinafter referred to as an "Origin" is determined. The Origin can be a warehouse, distribution center, office, or the like from which a safe and traversable route will begin. Addresses that could potentially be destinations for a delivery vehicle, hereinafter referred to as the "Destination", within the given city are listed (101). The purpose of the method is to determine a route that can safely be traversed by an autonomous or semi-autonomous delivery vehicle. Such a vehicle can loosely be described as a "robot". The delivery vehicle generally comprises a self-propelled vehicle capable of making at least one or more action decisions based on input received from its present environment. That is, the vehicle can decide how best to proceed, or whether not to proceed, when making deliveries given changing external conditions. In one or more examples, the robot is narrow enough to fit on a small crowded sidewalk and can operate in most conditions as a human delivery person would. In one or more examples, the paths along which the robot operates include sidewalks, ramps, driveways, crosswalks, and curbs.

The city or area within a city selected in step (101) forms the area in which the delivery vehicle will operate. Prior to the delivery vehicle beginning operation, some or all of the area is traversed (102) by a traversal entity. The traversal entity gathers data so that a determination can be made regarding whether to approve a path (103) as safe and traversable by the delivery vehicle. The traversal entity may be the same entity that makes the approval decision (103), or may be an entity that gathers data about the path while another entity or person decides whether to approve or not approve the path (103).

The traversal entity may be a person that traverses and visually observes a proposed path from Origin to Destination. Alternatively, the person may operate an electronic device such as a video camera, lidar, or radar when traversing a proposed path. The recorded data can later be analyzed to determine whether to approve the path (103) from Origin to Destination. If less than the entire area is traversed (102), the person may travel only proposed paths from the Origin to one or more Destinations.

Alternatively, the traversal entity may be an autonomous, semi-autonomous, or manually controlled vehicle device that can traverse an area (102) and proposed paths within that area. The path traversal vehicle may be a robot that utilizes one or more sensors to gather data about a path traversed (102) within the area. When traversing a proposed path, the path traversal vehicle records data about proposed paths within an area so that the determination whether to approve the path as safe (103) can be made.

If the path is approved as safe, it is marked as an approved path (106) and is stored in an electronic database as a new path (107). The newly approved path is then considered to be safe and traversable. Delivery vehicles that must traverse from Origin to Destination can use paths that are approved.

Once a path is approved (103), a sensor array is used to gather data about the path (104). The sensor array comprises a plurality of sensors including, but not limited to: a Global Positioning System (GPS) sensor, video, laser, sonar, odometer, and lidar devices. The output from each sensor is saved in a high level or summary form. In an embodiment of the present invention, approved paths are mapped a plurality of times under differing conditions. These differing conditions include different weather conditions, different traffic conditions, different times of day, and the like. A maximum delta value is then determined for each sensor using empirical or Bayesian methods. The maximum delta value represents a threshold for use by the delivery vehicle when traversing the path. If the delta value is met or exceed, the delivery vehicle may create an alert, make a decision, or perform an action in response to meeting or exceeding the delta value.

If the path is not approved, it is marked as an unapproved path (105). That path is deemed to be unusable by a delivery vehicle. The path may be unsafe, not traversable, or may contain one or more obstacles that the delivery vehicle cannot overcome. If a path is marked as unapproved (105), the traversal entity decides whether it has completed (109) traversing the area. If not, it continues to traverse the area (102). If it has completed traversing the area (109), then the process illustrated in this FIG. 1 ends (110).

Figure 2:
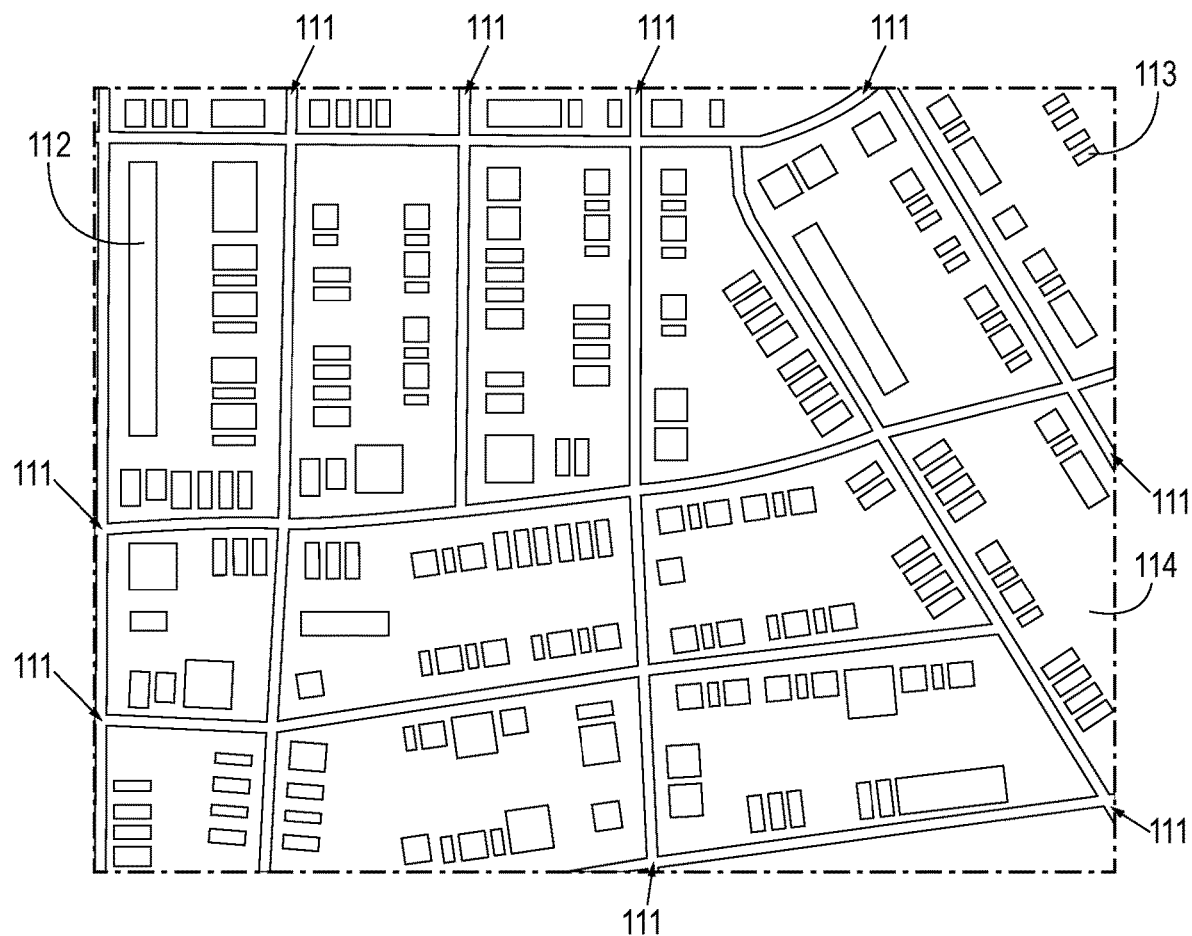
FIG. 2 is a map showing a city section where a safe, traversable path is to be mapped as according to an embodiment of the present invention.

Referring now to FIG. 2, there is shown a map of a city section where a safe, traversable path is to be mapped as according to an embodiment of the present invention. This map depicts an area that a user selects to operate in during step (101) of FIG. 1. An area generally comprises a plurality of streets (111) and city blocks (114) as commonly found in an urban setting. The area chosen in FIG. 1 (101) is the area through which a delivery vehicle must pass. Before the delivery vehicle can safely traverse through the area, the traversal entity travels through the area and observes or records information about the area. The traversal entity collects visual or sensor data about the area so that a safe and traversable path from an Origin to a Destination can be mapped. It is important to note that potential Destinations can include residences (113) or non-residences (112) such as businesses.

The traversal entity may traverse some or all of the area, some or all of the streets (111), or may pass by some or all of the buildings (112, 113) in the area depending on the specific embodiment of the present invention.

Figure 3:
FIG. 3 is a map showing a city section where a safe, traversable path is mapped as according to an embodiment of the present invention.

Referring now to FIG. 3 there is shown a map of a city section where a safe, traversable path is mapped as according to an embodiment of the present invention. If a route (116) is approved as safe (FIG. 1 (103)) from an Origin (115) to a Destination (117) the route (116) is marked as approved (FIG. 1 (106)) and a sensor array gathers data (FIG. 1 (104)) about the path. Operation of the sensor array may occur manually, semi-autonomously, or autonomously.

The exact method by which the sensor array gathers information about the route (116) is embodiment specific. In one embodiment of the present invention, a sensor array is traversed along the route (116) from Origin (115) to Destination (117). The sensor array is mounted on a vehicle and driven along the route (116) that a delivery vehicle will later take from Origin (116) to destination (117). In another embodiment of the present invention, a sensor array is carried by a user walking the route (116) in reverse from Destination (117) to Origin (115). In still another embodiment of the present invention, a sensor array is mounted to a vehicle and a portion of the route (116) is driven by a user, the user then deviates from the route (116), then later returns to traverse a different portion of the route (116). In this embodiment of the present invention, deviation then resumption from mapping the route (116) may be necessary because a delivery vehicle may be able to traverse portions of the route (116) in an order different from an automobile, such as by proceeding up a sidewalk against one-way traffic.

Furthermore, some or all of a route (116) may be traversed a plurality of times to determine a range of operating conditions for a delivery vehicle. The range of operating conditions could include recording data from one or more type of sensor at different times of day, in different weather conditions, during rush hour or non-rush hour times, and the like. The purpose of traversing the route (116) a plurality of times is to develop a normal operating range for the delivery vehicle. During delivery operations, if a sensor on the delivery vehicle exceeds an operating range threshold, that occurrence would indicate a deviation from normal operating conditions. This occurrence would trigger an alarm, require the delivery vehicle to make a decision, or cause the delivery vehicle to notify a teleoperator at a control center. In some examples, the teleoperator then will control the robot manually until the operating range threshold is no longer exceeded.

Some examples of events that would result in a sensor detecting a non-normal condition could include, but is not limited to; a radar sensor detecting a delivery vehicle blocking a sidewalk, a camera detecting a pedestrian standing in the path of the delivery vehicle, a loss of GPS signal, a sonar sensor detecting a telephone pole down across a road. Environmental conditions such as snow, heavy rain, flooding, ice, or excessive heat could result in the occurrence of a non-normal condition.

Figure 4:
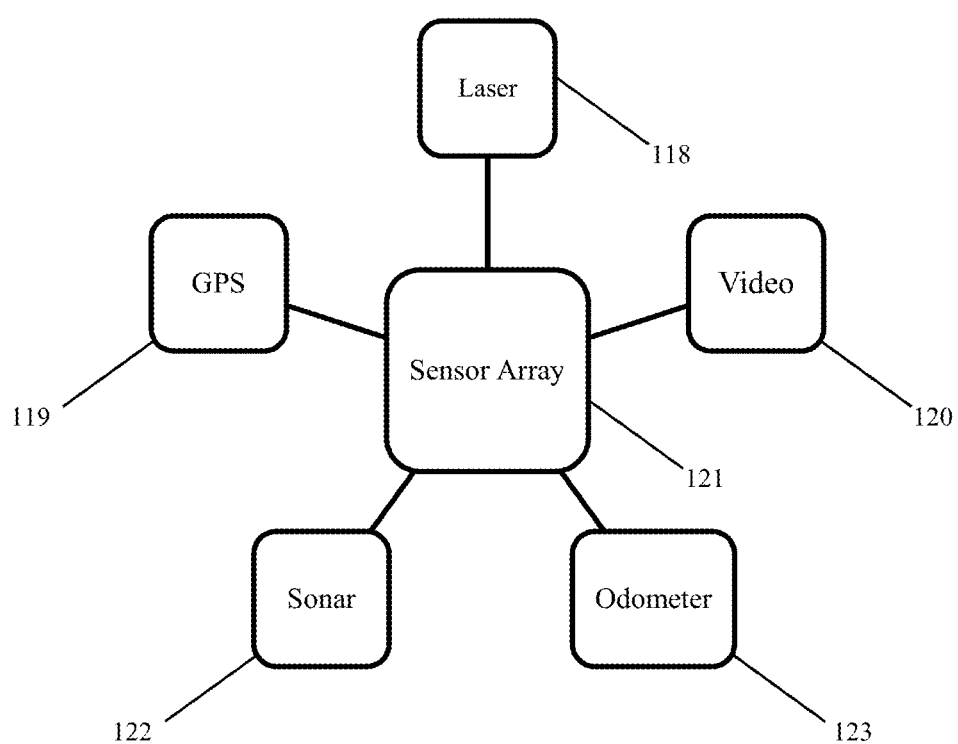
FIG. 4 is a block diagram showing a sensor array used to map a safe, traversable path as according to an embodiment of the present invention.

Referring now to FIG. 4, there is shown a block diagram of a sensor array (121) used to map a safe, traversable path as according to an embodiment of the present invention. The sensor array (121) comprises a plurality of sensors that are used to record data about a traversable path as illustrated in FIG. 3 (116). The array comprises at least one, but often more, sensors that each record a different type of data. In an embodiment of the present invention, a sensor array (121) comprises a laser (121), a GPS (119), a video recording device (120), a sonar (122), and an odometer (123). Other embodiments of the present invention may include different combinations of sensors or sensors not pictured in this FIG. 4. By way of example, an embodiment of the present invention may add a thermometer or altimeter to the sensor package depicted in FIG. 3.

It should be noted that a delivery vehicle traversing the route mapped by the sensor array (121) may contain some or all of the same sensors (118-120, 122, 123) as the array (121). The delivery vehicle could then monitor the same sensor data for out-of-normal conditions. The occurrence of which may require an action or decision to be taken or made by the delivery vehicle or a teleoperator.

Figure 5:
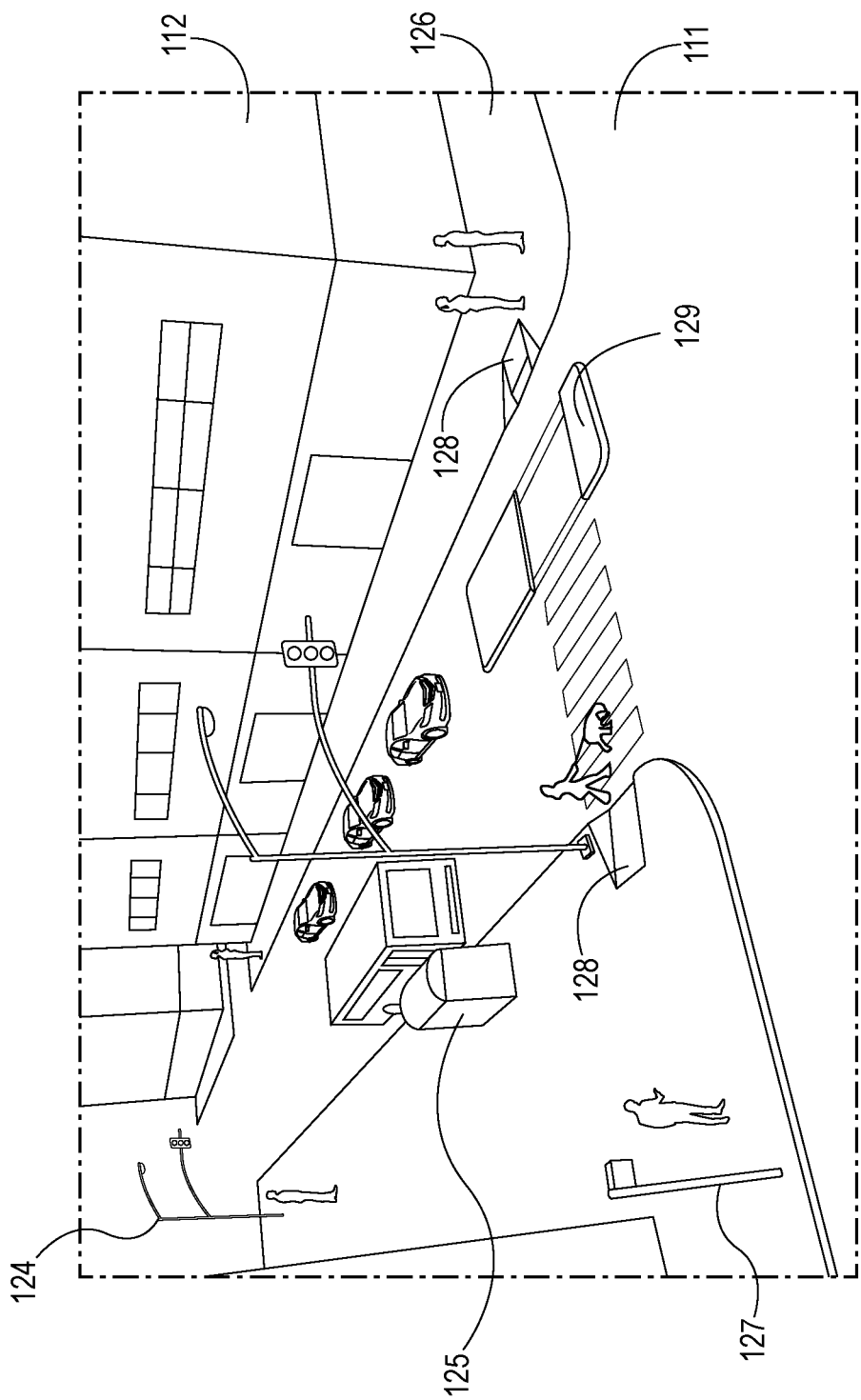
FIG. 5 is a drawing showing objects to be mapped when determining a safe, traversable path as according to an embodiment of the present invention.

Referring now to FIG. 5, there is shown a drawing with objects to be mapped when determining a safe, traversable path as according to an embodiment of the present invention. The drawing depicts an exemplary street scene, an intersection, as found in many urban environments. When mapping or traversing a route, the sensor array mapping the route and the delivery vehicle traversing the route must be aware of some or all of the objects within the environment.

At a common city intersection, mapping sensor arrays and delivery vehicles may use sensors to locate and identify: street lamps (124), commercial buildings (112), bus stop shelters (125), sidewalks (126), crosswalk signals (127), crosswalk ramps (128), crosswalk islands (129), and streets (111). Naturally, there may be many more objects that a sensor array must map and a delivery vehicle be aware of than those pictured in this FIG. 5.

Each of the aforementioned urban features (111, 112, 124-129) may be detectable by a different type of sensor included as part of the sensor array or delivery vehicle. By way of example, a bus shelter (125) may be detectable by a radar sensor while a crosswalk ramp (128) may be detectable by a video camera. However, some types of features may be detectable by two or more sensors. Video data received from a video camera may be integrated with radar data to detect or refine the exact location of a building (112).

Proper mapping of the urban environment is required because each of the urban features (111, 112, 124-129) may cause a delivery vehicle to behave in a different manner. Upon detection of a street light (124), the delivery vehicle may alter course to avoid collision. But upon detection of a sidewalk ramp (128), the delivery vehicle may alter course to make use of the ramp (128). In addition, upon detection of a street (111), the delivery vehicle may activate additional sensors to scan for approaching vehicles prior to crossing.

Those skilled in the art will appreciate that the conception, upon which this disclosure is based, may readily be utilized as a basis for designing other structures, methods, and systems for carrying out the several purposes of the present invention. It is important, therefore, that this description be regarded as including such equivalent constructions insofar as they do not depart from the spirit and scope of the present invention.

Although certain example methods, apparatus, apparatus and articles of manufacture have been described herein, the scope of coverage of this application is not limited thereto. On the contrary, this application covers all methods, apparatus and articles of manufacture fairly falling within the scope of the invention either literally or under the doctrine of equivalents.

Therefore, the foregoing is considered as illustrative only of the principles of a method for determining safe and traversable paths. Further, since numerous modifications and changes will readily occur to those skilled in the art, it is not desired to limit the method for determining safe and traversable paths to the exact construction and operation described, and accordingly, all suitable modifications and equivalents may be resorted to, falling within the scope of the present invention. While the above description describes various embodiments of the present invention, it will be clear that the present invention may be otherwise easily adapted to fit other configurations.

As various changes could be made in the above constructions without departing from the scope of the invention, it is intended that all matter contained in the above description shall be interpreted as illustrative and not in a limiting sense.

What is claimed is:

1. A method for establishing a safe and traversable route for a robot delivery vehicle, the method comprising:
traversing a route by a first traversal entity while gathering first sensor data on one or more objects contained within the route using a first set of one or more sensors included in the first traversal entity, wherein the first set of one or more sensors includes at least one of a GPS sensor, a video camera, a laser sensor, a sonar sensor, a radar sensor, and a lidar sensor;

using the first sensor data by a person to manually determine the route as safe and traversable by the robot delivery vehicle when the one or more objects contained within the route are not impassable by the robot delivery vehicle;

storing the route by a person in a database as a safe and traversable route when the route is determined to be safe and traversable by the robot delivery vehicle;

traversing the safe and traversable route by a second traversal entity while collecting second sensor data on the one or more objects contained within the safe and traversable route using a second set of one or more sensors included in the second traversal entity, wherein the second set of one or more sensors includes at least one of a GPS sensor, a video camera, a laser sensor, a sonar sensor, a radar sensor, and a lidar sensor; and using the second sensor data that is representative of the one or more objects to create a stored path of the safe and traversable route for use by the robot delivery vehicle when the robot delivery vehicle traverses the safe and traversable route.

2. The method of claim 1, wherein the person is a first person, the first traversal entity is a second person, and the second traversal entity is a third person.

3. The method of claim 2, wherein the second person operates the first set of one or more sensors to gather the first sensor data and the third person operates the second set of one or more sensors to gather the second sensor data.

4. The method of claim 1, wherein the first traversal entity is a first robot, and the second traversal entity is a second robot, and wherein the first robot and the second robot are self-propelled vehicles configured to travel over one or more of sidewalks and crowded sidewalks.

5. The method of claim 1, wherein the one or more objects includes one or more urban features, and wherein the one or more urban features includes at least one of a street lamp, a building, a bus stop shelter, a sidewalk, a crosswalk ramp, a crosswalk signal, a driveway, a crosswalk island, and a street.

6. The method of claim 1, wherein the robot delivery vehicle is a self-propelled vehicle configured to travel over one or more of sidewalks and crowded sidewalks.

7. The method of claim 6, wherein the robot delivery vehicle further is configured to travel over roads.

8. A method for establishing a route as not safe and traversable by a robot delivery vehicle, the method comprising:

traversing a route by a traversal entity while gathering sensor data on one or more objects contained within the route using one or more sensors included in the traversal entity, wherein the one or more sensors includes at least one of a GPS sensor, a video camera, a laser sensor, a sonar sensor, a radar sensor, and a lidar sensor;

using the sensor data by a person to manually determine the route as not safe and traversable by the robot delivery vehicle when the one or more objects contained within the route are impassable by the robot delivery vehicle; and storing the route by a person in a database as a not safe and traversable route when the route is determined to be not safe and traversable by the robot delivery vehicle, and wherein the not safe and traversable route is not used as a delivery route for the robot delivery vehicle.

9. The method of claim 8, wherein the robot delivery vehicle is a self-propelled vehicle configured to travel over one or more of sidewalks and crowded sidewalks.

10. The method of claim 8, wherein the person is a first person and the traversal entity is a second person, and wherein the second person operates the one or more sensors to gather the sensor data.

11. The method of claim 8, wherein the traversal entity is a robot, wherein the robot is a self-propelled vehicle configured to travel over one or more of sidewalks and crowded sidewalks.

12. A method for mapping a safe and traversable route for a robot delivery vehicle, the method comprising:

traversing a safe and traversable route under a first condition by a first traversal entity while gathering a first sensor data on one or more objects contained within the safe and traversable route using a first set of one or more sensors included in the first traversal entity, wherein the first set of one or more sensors includes at least one of a GPS sensor, a video camera, a laser sensor, a sonar sensor, a radar sensor, and a lidar sensor, and wherein the first condition includes at least one of a weather condition, a time of day, and a traffic condition;

using the first sensor data that is representative of the one or more objects to create a stored path of the safe and traversable route for use by the robot delivery vehicle when the robot delivery vehicle traverses the route;

traversing the safe and traversable route under a second condition by a second traversal entity while gathering a second sensor data on the one or more objects contained within the safe and traversable route using a second set of one or more sensors included in the second traversal entity, wherein the second set of one or more sensors includes at least one sensor of the same type as the first set of one or more sensors, and wherein the second condition differs from the first condition respective to at least one of the weather condition, the time of day, and the traffic condition;

determining a deviation between the first sensor data that is representative of the one or more objects detected under the first condition and the second sensor data that is representative of the one or more objects detected under the second condition, wherein the deviation is determined between sensor data of the same type; and using the deviation to create an operating range threshold that is to be included in the stored path and used by the robot delivery vehicle as a threshold for normal operating conditions when the robot delivery vehicle traverses the safe and traversable route.

13. The method of claim 12, wherein the robot delivery vehicle is a self-propelled vehicle configured to travel over one or more of sidewalks and crowded sidewalks.

14. The method of claim 12, wherein the robot delivery vehicle includes a third set of one or more sensors, wherein the third set of one or more sensors includes at least one sensor of the same type as the second set of one or more sensors.

15. The method of claim 14, wherein the robot delivery vehicle is configured to detect a non-normal operating condition that exceeds the operating range threshold using the third set of one or more sensors when the robot delivery vehicle traverses the safe and traversable route.

16. The method of claim 15, wherein the non-normal operating condition includes at least one new object that is not represented in the first sensor data and the second sensor data, and wherein the at least one new object includes one or more of a vehicle blocking the safe and traversable route, a person blocking the safe and traversable route, and an anomalous object blocking the safe and traversable route.

17. The method of claim 15, wherein the non-normal operating condition includes at least one environmental condition, and wherein the at least one environmental condition includes one or more of snow in the safe and traversable route, heavy rain in the safe and traversable route, flooding in the safe and traversable route, and ice in the safe and traversable route.

18. The method of claim 15, wherein the robot delivery vehicle is configured to trigger an alarm when the robot delivery vehicle detects the non-normal operating condition.

19. The method of claim 15, further comprising notifying a teleoperator at a control center by the robot delivery vehicle when the robot delivery vehicle detects the non-normal operating condition; and receiving commands from the teleoperator by the robot delivery vehicle until the operating range threshold is not exceeded.

20. The method of claim 12, further comprising traversing the safe and traversable route by the second traversal entity a plurality of times under a plurality of conditions while gathering a respective plurality of sensor data sets on the one or more objects contained within the route using the second set of one or more sensors included in the second traversal entity, wherein each sensor data set of the plurality of sensor data sets is gathered by the second traversal entity under a different condition; and using the plurality of sensor data sets to determine the deviation between all sensor data sets.

* * * * *